(Model.)

R. EMERSON.

GRAIN BINDER.

No. 377,744. Patented Feb. 14, 1888.

Witnesses
W. C. Coolies
A. M. Best

Inventor
Richard Emerson
By Coburn & Thacher
Attorneys (Model.)

R. EMERSON.
GRAIN BINDER.

No. 377,744. Patented Feb. 14, 1888.

Witnesses
N. C. Collies
A. M. Best

Inventor
Richard Emerson
By Coburn & Thacher
Attorneys

UNITED STATES PATENT OFFICE.

RICHARD EMERSON, OF SYCAMORE, ILLINOIS, ASSIGNOR OF ONE-HALF TO HORATIO H. MASON, OF SAME PLACE.

GRAIN-BINDER.

SPECIFICATION forming part of Letters Patent No. 377,744, dated February 14, 1888.

Application filed August 31, 1885. Serial No. 175,856. (Model.)

*To all whom it may concern:*

Be it known that I, RICHARD EMERSON, a citizen of the United States, residing at Sycamore, in the county of De Kalb and State of Illinois, have invented certain new and useful Improvements in Grain-Binders, which are fully set forth and described in the annexed specification, reference being had to the accompanying drawings, in which—

Figures 1, 2:
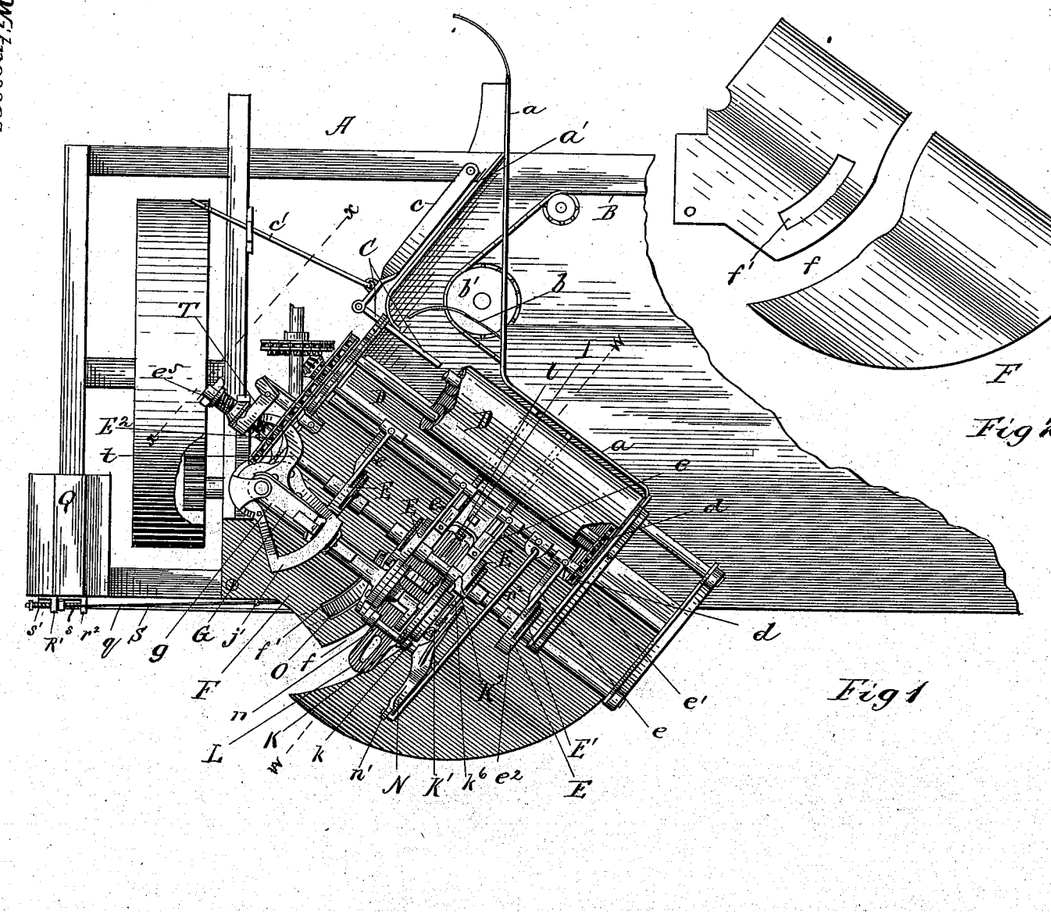
Figure 1 represents a plan view of a harvester provided with a grain-binder embodying my improvements, the grain end of the platform being broken away.
Fig. 2, a plan view of the binder-deck detached.

The figures of the drawings are on three different scales. Figs. 1 and 2 are on the same scale; Figs. 3 to 9, inclusive, on the same scale, enlarged from the former; and the figures, from 10 to 21, inclusive, on the same scale, but still more enlarged.

My invention relates to machines intended for use with grain-harvesters for automatically binding the grain in bundles as it is cut and delivered by the harvester to the binder; and the object of my present improvements is to provide a grain-binder adapted to the harvesting-machine described and shown in my Patent No. 349,932, dated September 28, 1886.

The invention consists in certain improvements in various parts of the binder, whereby a machine is produced adapted to the peculiar position of the elevator, shown in my prior application mentioned above, whereby the grain is delivered to the binder by the said elevator, is properly bound in bundles, and discharged from the binder.

I will now describe in detail one way in which I have carried out my invention in practical form, and will then point out definitely in the claims the special improvements which I believe to be new and wish to protect by Letters Patent.

So far as the harvester is concerned, including the elevating mechanism, the machine shown in the drawings in the present case is intended to be the same as shown in my prior patent mentioned above, to which reference is made for a full description. I shall here only refer to such parts as are necessary to understand my present invention and to illustrate some slight changes that I have made.

Figure 9:
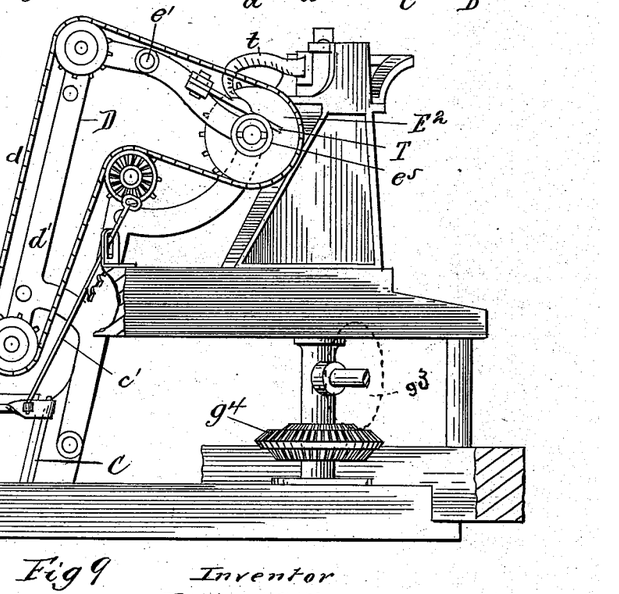
Fig. 9, a similar section taken on the line $x\,x$, Fig. 1.

In the drawings, A represents the main frame of the machine, to which the platform and rakes are to be applied, as in my former application; and $a$ is the upright guard or fender, which extends backward from the front of the platform to the elevators. The rake-chain B and rakes $b$, I bring nearer to this guard by moving the wheel $b'$, over which the chain runs at this end of the platform, up close to the guard, and, in fact, extending partly underneath it. The location of the outer guard, $a'$, is also changed accordingly, being brought very nearly into line with the plane of the forward end of the elevator-rollers and extending back to them, being curved slightly at its inner end, as shown in Fig. 1 of the drawings. This provides a better path for directing the grain to the elevator, and the rakes will sweep in the grain to the latter mechanism in better shape. I have also provided a device for regulating the position of the butts with reference to the elevator. This consists of a board, C, set on the platform at the forward end of the elevator just back of the front canvas of the elevating mechanism, as shown in Figs. 1 and 9 of the drawings. This board, which may be called a "butt-adjuster," is attached to a supporting-arm, c, pivoted at the other end to a sill of the main frame, and by vibrating this supporting-arm the board may adjusted inward and outward with reference to the elevator. Now, from an examination of Fig. 1 of the drawings, it will be seen that the rakes bring the butts of the grain up against this adjuster, and the delivery to the elevators is not effected until the butts are carried past the inner end of the board. Obviously, then, by adjusting this board more or less inward the grain will be delivered to the elevator at different points along the width of the canvas, thereby regulating the position of the grain to the canvas laterally, and hence to the binding mechanism, to which the grain is delivered by the elevator. This adjustment is made to suit different lengths of grain, and is effected by means of a rod, $c'$, which is fastened to the supporting-arm and carried up thence to a point within easy reach of the driver, who adjusts the board according to the length of the grain.

The elevator D is substantially the same as in my prior patent mentioned above, and located, as therein shown and described, near the rear inner corner of the platform, and arranged diagonally to the latter. I have found it desirable, however, to provide chains $d$ at the rear ends of the rollers running over sprocket-wheels on the upper and lower rollers, thereby giving positive motion to all of the rollers, and so insuring the required movement of the aprons, which, in the upright position of the elevator, will meet with greater resistance in carrying up the grain than in the ordinary inclined position. The addition of these chains will prevent any interruption in the movement of the aprons.

The packer is located and driven substantially as shown in my prior application. On the packer-shaft are stationary disks E, through which the shaft passes, and which are supported by arms $e$, attached to a rod or cross-bar, $e'$, at the upper part of the elevator-frame.

Figures 11, 12, 13, 14, 15, 16, 17, 18, 19, 20, 21:
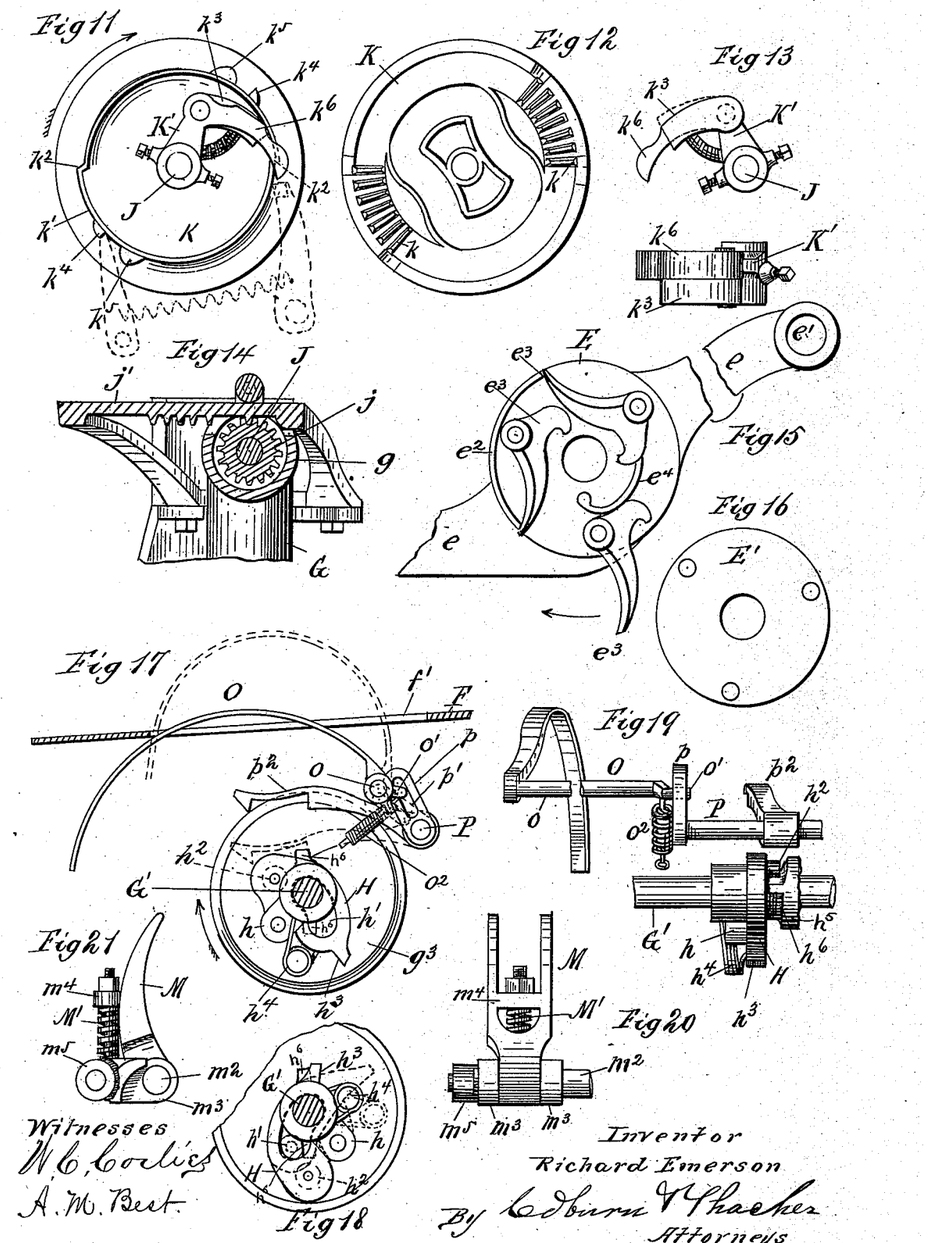
Fig. 11, an outside elevation of the cam and gear wheel detached.
Fig. 12, an inside elevation of the same.
Fig. 13, an elevation and plan of the clutch device for connecting the cam and gear wheel to its shaft.
Fig. 14, a detail section taken on the line $y\,y$, Fig. 3.
Fig. 15, a detail section of the packer, taken on the line $z\,z$, Fig. 3.
Fig. 16, an elevation of the revolving disk of the packers.
Fig. 17, an elevation of the automatic tripping device detached, the parts being shown in full lines in position when the binder is in operation.
Fig. 18, a detail elevation of the trip-clutch and adjacent parts in position when the binder is at rest.
Fig. 19, a rear elevation of the tripping mechanism.
Fig. 20, an outer elevation of the compressor detached.
Fig. 21, a side elevation of the same.

These disks have a flange, $e^2$, cut away at certain points, and disks E' are secured to the shaft so as to turn with it and fit just within the flange of the stationary disks. The packer-arms $e^3$ are of an ordinary form, something like a bell-crank, and are pivoted to the rotating disks. The stationary disks are also provided with a cam, $e^4$, on their inner faces, which is arranged to turn the packer-arms down as they are brought around against the incoming grain. The flange $e^2$ at the back of the disk—that is, toward the stubble side of the machine—is entire, and the packer-arms will come in contact therewith as they are carried around and be turned back and inward between the two disks during the ineffective portion of their revolution. The relation of the cam and this flange is shown in Fig. 15 of the drawings, from which it will be seen that the arms will strike the flange about as soon as they are freed from the cam. It will be understood, of course, that the packer is arranged diagonally to the platform the same as the elevator.

The deck F of the binder is shaped as shown in Fig. 2 of the drawings, and is attached to suitable supports and extends from the head of the rear elevator-apron backward and outward, projecting out underneath the packer in a nearly-horizontal position. This deck has one bent or curved slot, $f$, passing nearly or quite through it, and a second shorter slot, $f'$, which is also curved and arranged a little inside of the former. An angular frame, G, is mounted upon an upright journal-post at the inner end of the binder-deck. The central piece of this frame is a sleeve, which passes over the journal-post, so as to turn thereon. At the upper end of this section is another portion of the frame, consisting of a hollow arm, $g$, projecting out over the deck, and the remaining piece of the frame is an arm, $g'$, either hollow or solid, projecting out in the same way below the deck. This frame carries the binding mechanism, and is swung on its journal in and out to and from the elevator and packer, the binding of the bundle being accomplished during the outward swing of the carrying-frame. I will now explain how the swinging motion is given to this frame.

Figures 4, 22, 23:
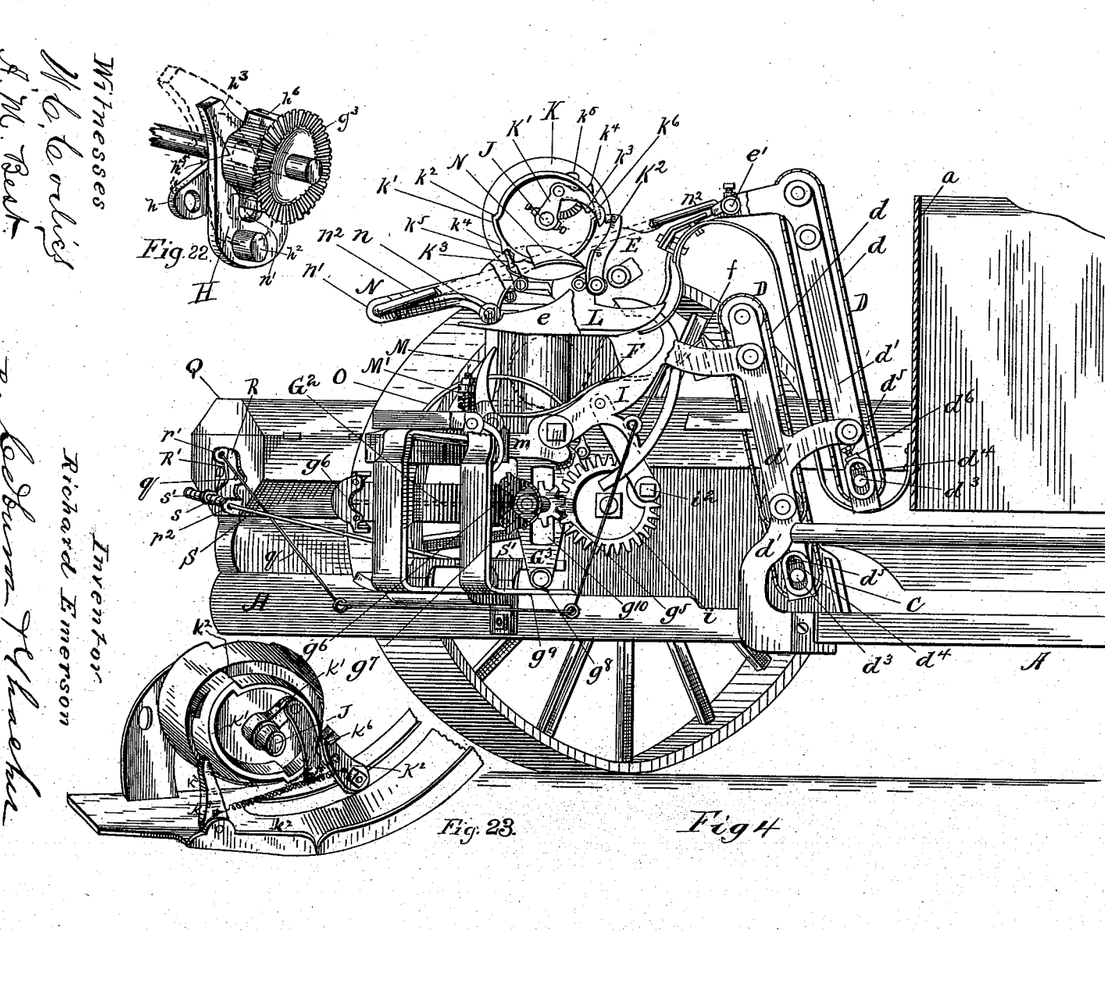
Fig. 4, a similar perspective view looking from the grain side.
Fig. 22 is a perspective view of the clutch-pawl.
Fig. 23 is a perspective view of the tyer-wheel clutch mechanism.
Figure 5:
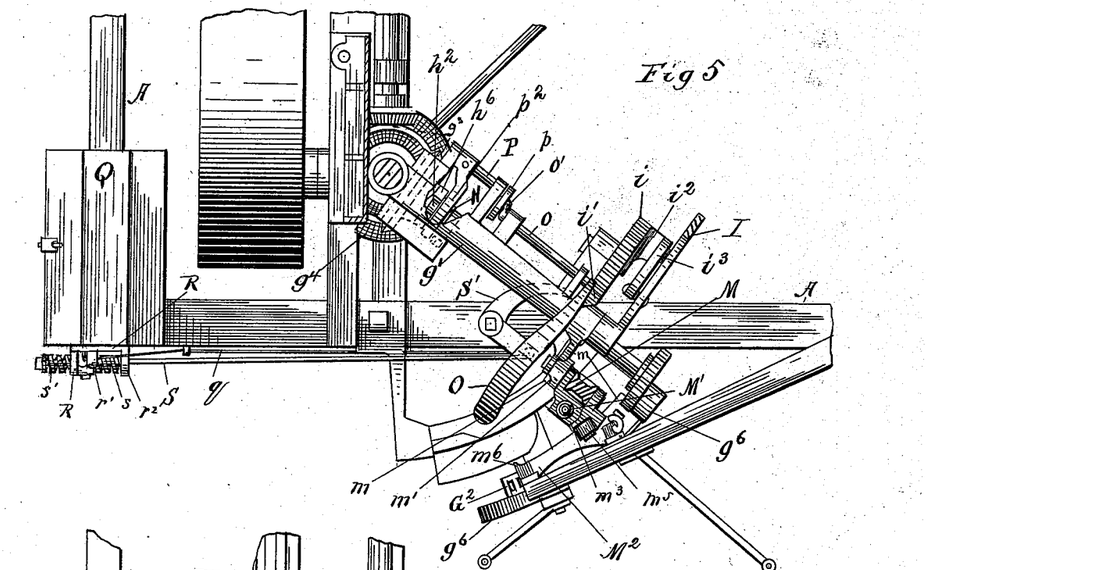
Fig. 5, a detail plan section taken on the line $u\,u$, Fig. 3.
Figures 6, 7:
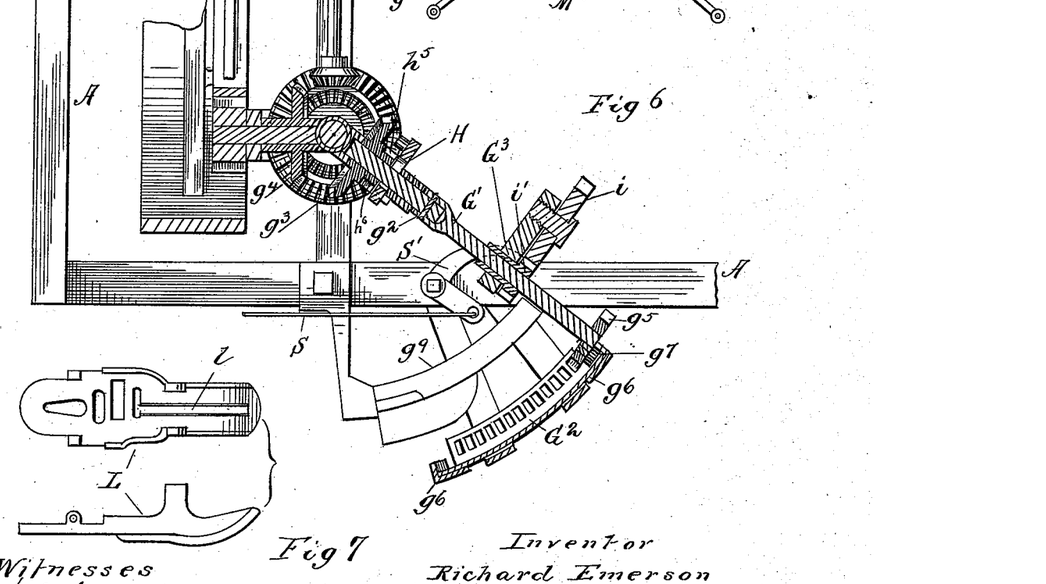
Fig. 6, a similar section taken on the line $v\,v$, Fig. 3.
Fig. 7, a plan and side elevation of the breast-plate.

A shaft, G', is mounted in suitable bearings on the lower arm of the frame, being arranged underneath it. This shaft is made in two parts coupled together by a universal joint, $g^2$, and at its inner end is provided with a beveled gear, $g^3$, which is mounted loosely thereon and engages with the inner bevel-gear section, $g^4$, on a horizontal wheel at the foot of the journal-post, to which motion is imparted from the main wheel of the harvester, as shown and described in my former case. The shaft is also provided with a clutch mechanism, by means of which the loose beveled wheel may be secured at the proper time to the shaft, thereby causing the latter to rotate. The outer section of this shaft projects out somewhat beyond its supporting-arm, and is provided with a gear-pinion, $g^5$, at its extremity, which engages with a rack, $G^2$, mounted on suitable supports below the outer portion of the binder-deck. This rack is curved and is provided with open or pin teeth, so that the pinion may engage therewith on both the upper and under sides thereof. It will be understood of course that the loose wheel on this shaft revolves continually in the same direction, and when clutched to the shaft the latter will of course be rotated always in one direction. Now, it must be obvious that as the shaft is rotated the engagement of the pinion with the rack will compel the pinion to travel along the rack, and of course this will vibrate the shaft horizontally to which the pinion is fastened, and so will vibrate or swing the frame in which the shaft is mounted. Now, these parts are so arranged that if the pinion engages with the rack at the inner end thereof and on the under side the direction of its rotation will swing the frame outward, and if at the outer end, on the upper side of the rack, will swing the frame inward. At each end of the rack are curved guides or flanges $g^6$, and on the outer face of the pinion is a small anti-friction roller, $g^7$, which engages with these guides at the end of the rack, thereby turning the shaft at the inner end downward and outward and at the outer end of the rack upward and inward. The relation of these parts is shown in Figs. 4 and 6 of the drawings. The universal joint between the two sections of the shaft permits the outer end carrying the pinion to rise and fall, so as to pass either above or below the rack. A bracket, $G^3$, depends from the outer end of the lower arm of the frame, and at its lower end carries an anti-friction roller, $g^8$, which runs upon a track, $g^9$, fastened to the frame of the machine, thereby supporting the swinging frame and preventing it from sagging. A vertical slot, $g^{10}$, is cut in this pendant to accommodate the movement of the outer section of the jointed shaft, which passes through this slot.

The loose wheel $g^3$ is clutched to the shaft $G'$ in the following manner: A pawl, H, is pivoted to a short supporting-arm, $h$, fastened to the shaft. This pawl is of the form shown in Figs. 17 and 18 of the drawings, and is provided with a segmental slot, $h'$, struck from the pivot as a center, through which the shaft passes, and consequently the pawl may be vibrated on its pivot moving around the shaft in this slot. At one end of the pawl on the inner face there is an anti-friction roller, $h^2$, and at the other end is a square-faced stop projection, $h^3$, and a retractile spring, $h^4$, is arranged to throw the pawl when free into working position, which is done by turning the pawl so that the end of the slot at the roller end of the pawl will be brought down to the shaft and the stop end $h^3$ be thrown farthest away from the shaft, as shown in Fig. 17 of the drawings. On the inner face of the loose wheel is fixed the clutch-stop $h^5$, which is of an elliptical form and arranged at the center of the wheel, extending radially a short distance therefrom on opposite sides of the shaft. The face of this stop is cut away to provide wings or teeth $h^6$ at opposite ends, which operate in the well-known way to engage the roller of the pawl when the latter is actuated by the force of the spring, thereby bringing the roller in toward the shaft, when it will stand in the path of these teeth. This position of the pawl is shown in Fig. 17 of the drawings, and obviously the wheel will now be secured to the shaft and the latter will be rotated. This clutch-pawl is operated by an automatic trip mechanism, which I will describe presently.

The needle-arm I is pivoted to the outer end of the lower arm of the swinging frame. A gear-wheel, $i$, is mounted on a stud-journal fixed to a projection extending inward from the pendant $G^3$, and a pinion, $i'$, on the outer section of the jointed shaft engages with this wheel. The wheel $i$ is provided with a crank-pin, $i^2$, on its outer face, to which a link or pitman, $i^3$, is connected at one end, the other end being pivoted to the needle arm. Obviously, whenever the jointed shaft is rotated, the wheel $i$ will be revolved, thereby vibrating the needle-arm through the action of the crank-pin and pitman. It will be seen that all of these parts are mounted on the vibrating frame, so as to be carried back and forth with the swinging movement of the latter. As the pinion $i'$ is on the vibrating section of the shaft, its teeth must be made somewhat oval in form, so as to accommodate the rocking of the pinion by the vibration of the shaft-section which carries it.

Figures 3, 24:
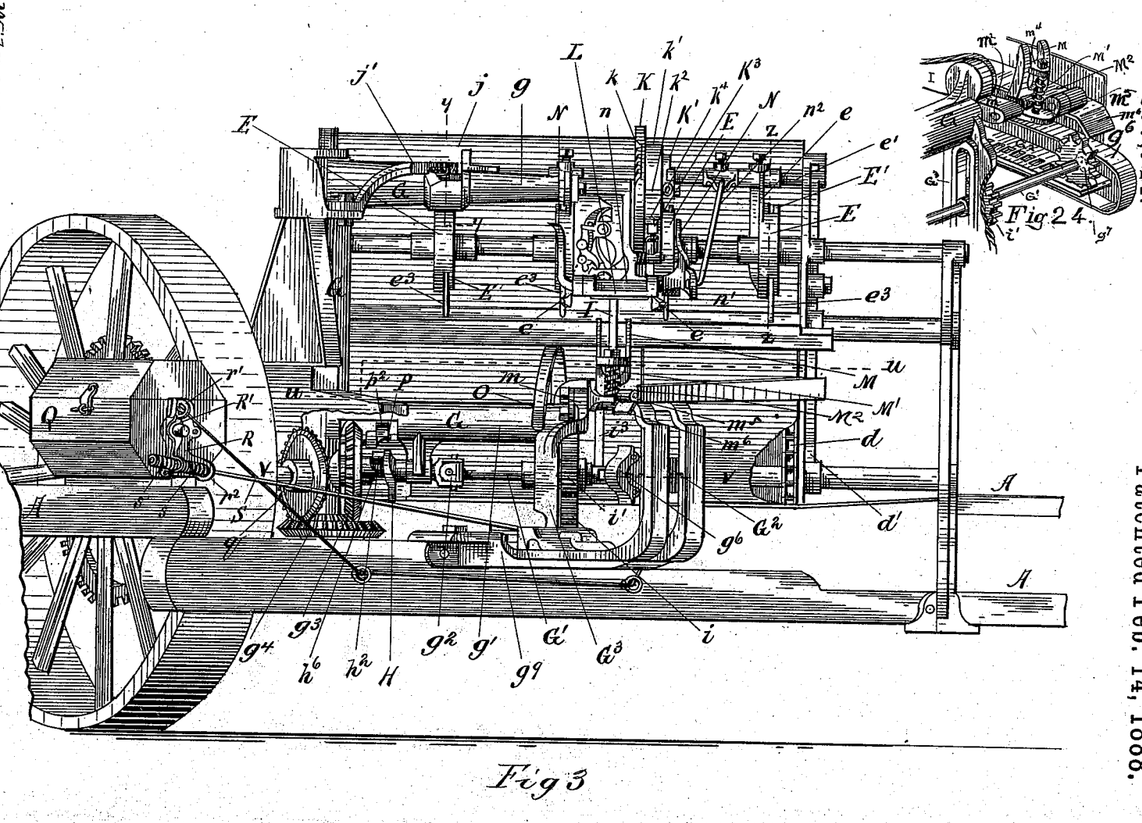
Fig. 3, a perspective view of the machine, looking from the stubble side.
Fig. 24 is a perspective view of the compress and operative mechanism.

I employ, as usual in a cord grain-binder, a shaft which carries the actuating-cam and gear-wheel. This shaft (designated J in the drawings) is mounted in the hollow arm that makes the upper part of the swinging frame, this arm forming a sleeve-journal for the shaft. Near the inner end of this shaft is a beveled pinion, $j$, the sleeve being enlarged at this point and cut away at the upper portion thereof to uncover the pinion, as shown in Figs. 3 and 14 of the drawings. Immediately above the pinion is a circular rack, $j'$, with teeth projecting downward, so as to engage with the pinion. This rack is mounted on an upright standard, which also supports the swinging frame. Obviously, as the frame is swung in and out, the shaft J will be rotated first in one direction and then in another by the engagement of its pinion with the rack. The cam and gear wheel K is mounted loosely on the outer end of this shaft, which projects beyond the sleeve for this purpose. The wheel is provided with cams for the usual purpose of actuating certain devices belonging to the knotting mechanism and with gear-sections to drive the knotting-hook shaft. Instead of one gear-section, however, I provide two such sections, $k$, arranged on opposite sides of the center of the wheel, as shown in Fig. 12 of the drawings, the purpose of which is to tie a knot, and so bind the bundle, with each half-revolution of the wheel. To accomplish this result, I provide a clutch mechanism which operates to secure the wheel to the shaft only on the outward swing of the latter, while on the inward swing the clutch is inoperative and the wheel remains stationary, although its shaft will revolve backward, as already explained. I will now explain this clutch mechanism.

On the back face of the wheel K is a narrow flange, $k'$, which is provided with angular bends or insets $k^2$ on opposite sides of the center of the wheel, being arranged directly opposite each other. It will be noticed that these bends provide stops or flat seats on both the inside and outside of the flange. An arm, K', is fastened to the shaft J, and on its outer end is pivoted a pawl, $k^3$, these parts being arranged so that the pawl is inside of the flange. This pawl is provided with a spring acting to throw it outward, and stands behind the shaft when at rest, as shown in Fig. 11 of the drawings, so that when the shaft is carried around in the direction of the arrow in Fig. 11 the end of the pawl will engage with the inside stop on the wheel, and of course the latter will now be clutched to the shaft and revolve with it. The direction of the arrow in this Fig. 11 shows the motion of the shaft when the frame is swinging outward. The rack and pinion heretofore described are so constructed relatively that the outward swing of the frame will give just a half-revolution to the wheel K, and when this movement is finished a spring-catch, $K^2$, engages on the outside of the flange with the stop-face thereon, which is now brought around behind the shaft. This spring-catch is pivoted to a lug on the breast-plate, the position of which will be described presently. On the outside of the flange are projections $k^4$ and $k^5$, arranged in pairs just a little back of the stop-faces. The first of these is square-faced on the back side, while the second is rounded, so as to operate as a cam. A spring-catch, $K^3$, is arranged to engage with the first in front of the shaft and opposite to the catch $K^2$, this catch, like the former, being pivoted and engaging with the stop just as the half-revolution of the wheel is completed, and being also pivoted to a portion of the breast-plate. It is evident from this description that when the wheel has completed its half-revolution at the end of the outward swing of its shaft it will be stopped and effectually held from movement in either direction by the catches operating on opposite sides thereof. This is its position during the backward swing of the shaft, the latter being rotated backward, however, during this movement, the spring-pawl of the clutch yielding to pass the stop-faces for this purpose. A short curved arm or lever, $k^6$, is fastened rigidly to the pawl-arm, and is extended over and beyond the flange, as shown in Fig. 11 of the drawings, the outer end being rounded. On the backward revolution of the shaft this outer end will be brought against the catch $K^2$, turning the latter outward, so as to completely disengage it from the wheel when the pawl has passed the inside stop, as shown in Fig. 4 of the drawings, thereby leaving the wheel free to move upon the next forward movement of the shaft, when, of course, the pawl will engage with the second stop-face on the flange. As soon as the wheel begins to move, the outer spring-catch, $K^3$, is turned out by the cam projection $k^5$ on the outside of the flange, thereby disengaging it from the stop $k^4$. This cam projection is not absolutely necessary, though I prefer to use it for the purpose of positively freeing the catch from the stop. It will be seen from this description that a half-revolution is given to the gear and cam wheel on each outward swing of the frame, and, as will be hereinafter explained, this movement of the frame is effected after the bundle is received and is ready to be bound. The knotting hook and shaft, cord-cutter, stripper, and other usual parts are not shown in the drawings, as they constitute no part of my present invention, and may be of any usual construction in grain-binders of this type. It will be understood, of course, that they are constructed and arranged with reference to the gear-sections and cams on the wheel K so that each half-revolution of the latter will give them the usual movements that are necessary to bind a single bundle. It will also be understood that the cams on this wheel are duplicated the same as the gear-sections and for the same purpose.

The breast-plate L is fastened to the upper arm of the swinging frame, being arranged in a nearly-horizontal position, and shaped substantially as shown in Fig. 7 of the drawings. It is provided with a longitudinal slot, $l$, for the needle-arm to pass up through to place the cord around the bundle and bring it to the knotting devices, which are on the upper side of the breast-plate, as well as the cord-holder. The two central arms, $e$, which support the packer, are extended forward in front of the latter—one each side of the breast-plate—as shown in Fig. 4 of the drawings. These projections may extend a little below the breast-plate, if desired, and form not only guides and guards for the latter, but also for the gavel, which is made underneath, as shown in the drawings mentioned above.

A compressor, M, is mounted on an arm, $m$, on the lower branch of the swinging frame and extending out in front of the latter slightly. A strap, $m'$, surrounds this arm, and a pivot-bolt, $m^2$, passes through the ears of a bracket, $m^3$, and the two ends of the strap, through which all are fastened together and to the supporting-arm by turning a nut on the end of the bolt. The compressor is pivoted on this bolt between the ears of the bracket, and on the body of the bracket is a spring, M', surrounding a rod attached thereto and passing up through a loop or eye, $m^4$, on the back of the compressor, the spring being held between the bracket and this loop and a nut being turned on the upper end of the rod above the latter. On the body of the bracket, at one side, is an anti-friction roller, $m^5$, which runs upon a curved way, $M^2$, fixed on suitable supports on the harvester-frame, in which position it holds the compressor upright, as shown in Figs. 20 and 21 of the drawings. This compressor constitutes the stop against which the gavel is formed by the packers, and obviously is held from turning out of position by the roller resting on the curved way. It will, however, yield slightly on its own pivot by the yielding of the spring behind it, this movement being sufficient to accommodate the condition of the grain and make a compact bundle. The tension placed upon the compressor-arm, it will be seen, may be adjusted by adjusting the nut above the loop. Now, while the frame is swinging outward and the cord is being tied the roller on the compressor-bracket travels along its curved way, thereby holding up the compressor; but the length of this way is regulated so that it terminates just a little before the forward movement of the swinging frame is completed. Then the roller passes off the end of the track down an inclined lip, $m^6$, and of course the bracket will turn down, carrying down the compressor in front with it to permit the discharge of the bundle. On the backward movement of the frame the roller $m^5$ travels up the incline $m^6$ on the track, bringing the roller up on the track again and the compressor into an upright position. In the meantime, however, the bound bundle has been discharged at the outer edge of the quadrant-shaped deck by means of discharge-arms N, which are on a shaft, $n$, mounted on the outer end of the breast-plate. A crank-arm, $n'$, extends upward or outward from one of these discharge-arms; or it may be fastened independently to the shaft, and a link-rod, $n^2$, extends from its outer extremity to the cross-bar $e'$, which, as heretofore explained, is stationary. These parts are so arranged that when the swinging frame is at its inner position the discharge-arms will be thrown up, as seen in Fig. 4 of the drawings; but it is evident that as the former swings outward the operation of the link will be to turn the arms downward, so that near the end of the movement they will come in contact with the bound and freed bundle and discharge it from the deck.

The automatic tripping device may be connected with the yielding compressor, which is the usual arrangement. I have, however, invented a tripping device entirely independent of this compressor-stop, which I will now proceed to describe.

Figure 8:
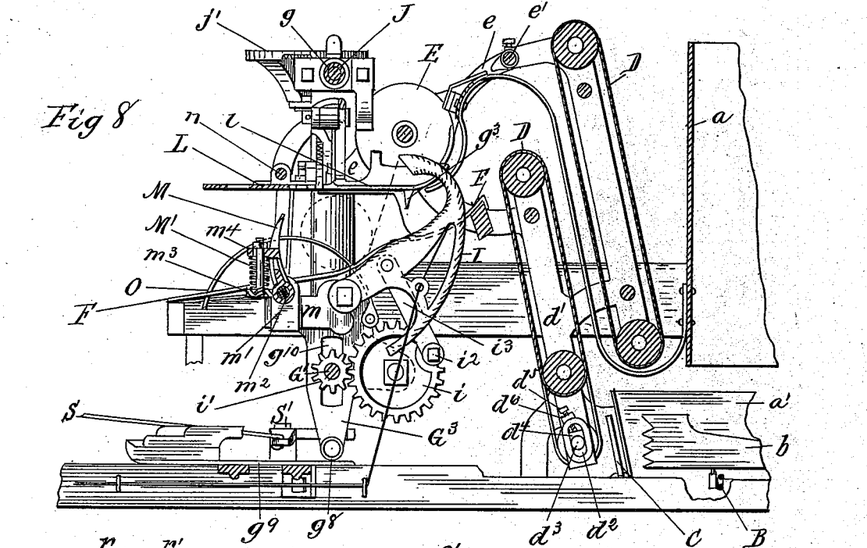
Fig. 8, a transverse section taken on the line $w\,w$, Fig. 1.

A bent rod, O, is fastened at one end to a rock-shaft, $o$, mounted suitably underneath the deck of the binder. The other end of the arm is free and the curved or bow portion projects up through the slot $f'$, rising above the deck in its normal position, as shown in Figs. 4 and 8 of the drawings. On the other end of the rock-shaft is a crank-arm, $o'$, to which is fastened a retracting-spring, $o^2$, the effect of which is to turn the shaft in a direction to throw the curved arm up through the slot in the deck, as shown in dotted lines in Fig. 17 of the drawings. A second rock-shaft, P, is arranged parallel to the shaft G', as shown in Fig. 19 of the drawings, on one end of which is a crank-arm, $p$, provided with a slot, $p'$, in which the crank of the arm $o'$ works, so that the rocking of the shaft $o$ will also oscillate the shaft P, but in an opposite direction. The stop-arm $p^2$ is fastened to this rock-shaft P in the same plane as that of the clutch-pawl on the shaft G'. In the normal position of these parts, when the curved arm rises above the deck this stop-arm is thrown down and engages with the stop projection on the clutch-pawl, thereby throwing the latter around and holding it out of engagement with the clutch projections on the loose wheel. Obviously the swinging frame and binder will now be at rest. This occurs when the swinging frame is at its inner position and ready to receive the gavel. As the grain is delivered upon the deck and the gavel formed against the compressor-stop by the action of the packers, it is evident that the curved arm will be depressed gradually until finally it is nearly or quite even with the deck. This movement of the arm rocks the shaft to which it is attached in opposition to the force of the spring and in a direction to turn the second shaft, P, so as to throw up the stop-arm attached thereto, until finally it is disengaged from the clutch-pawl, (this position being shown in full lines in Fig. 17 of the drawings,) and the spring on the latter will at once operate to throw the pawl around, as described above, and cause it to engage with the loose wheel-clutch. The swinging frame will then at once be set in motion, thereby setting all the binding apparatus in motion, as heretofore described. It is evident that the curved rod, which we may now call the "trip-arm," will be held in its depressed position until the bundle is discharged; but if the bundle alone was depended upon to hold the trip-arm down it would rise at once upon the discharge of the former, throw down the stop-arm, and release the clutch, thereby stopping the swinging frame at the end of its forward movement. In order to prevent this, the length of the slot in the deck in which the trip-arm works is such that when the former is in its elevated position it will nearly fill the slot, or at least the outer portion thereof, as shown in Fig. 17 of the drawings. Now, when the trip-arm is depressed, the clutch-pawl released, and the swinging frame moved forward, the trip-arm will of course be carried forward bodily with it, being mounted on the lower branch of the frame; but the deck is stationary, and so the trip-arm will be slipped along underneath the latter, as shown in full lines in Fig. 17 of the drawings, so that the edge of the deck at the outward end of the slot will act as a stop to prevent the rising of the trip-arm when the bundle is discharged. As the arm swings back the trip-arm will of course gradually rise in the slot until finally, about at the end of the return movement of the frame, the clutch is disconnected and the motion stopped.

The cord-box Q is mounted on some convenient part of the machine. I have shown it in the drawings located on the cross-beam just outside of the main wheel; but such location is not indispensable. The cord $q$ is run out thence through an opening in the box and other suitable guide-loops to the needle-arm.

Tension is applied to the cord by special devices, which I have invented and will now explain.

Figure 10:
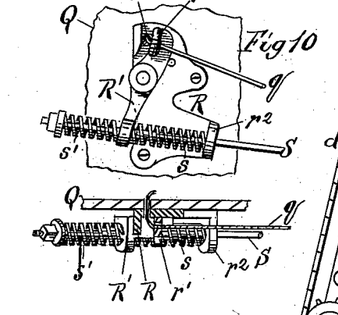
Fig. 10, an elevation and plan of the cord-tension device.

A bracket, R, is fastened to the cord-box, in the upper end of which is a hole, $r$, which registers with the hole in the box through which the cord runs, so that the latter also runs out through this aperture in the bracket, as shown in Fig. 10 of the drawings. A lever, R', is pivoted to the outer face of the bracket and arranged so that its upper end is near the cord-hole and will move across the latter when the lever is vibrated sufficiently. The upper end of this lever is provided with an eye, $r'$, through which the cord is run, this eye standing about at right angles to the bracket. The lower end of the lever, which may be called a "tension-lever," is free and is provided with an opening through which is passed the end of a rod, S. The rod passes through an eye, $r^2$, at the lower end of the bracket before reaching the lever, and between this bracket and the lever is arranged a spiral spring, $s$, which surrounds the rod, and the latter extends some little distance beyond the lever, being provided with a nut and washer on its extreme end, between which and the lever is a second spring, $s'$, around the rod. This last-named spring is considerably weaker than the spring $s$. The rod S extends inward at the back of the machine and is fastened to a bell-crank lever, S', pivoted to the rear sill of the frame at a point near the inner end of the track which supports the pendant of the swinging frame, as shown in Fig. 8 of the drawings. The free arm of this lever is curved or bent around so as to cross the path of the said pendant a little before it reaches the limit of its inward movement. Obviously when the pendant strikes this arm it will swing the lever, so as to make a pull on the rod S, thereby vibrating the tension-lever in a direction that will cause its upper end to clamp the cord more or less at the point where it passes through the bracket, thereby placing the required tension upon the cord. As soon as the bell-crank lever is released, the spring $s$, which has been compressed, will throw the tension-lever off and release the cord. The spring $s'$ is a retracting-spring, acting upon the rod and lever S', holding them in a normal position when free from the pendant. It will be noticed that the tension-lever is held between two springs, and this provides for any elasticity or yielding which may be necessary.

It is desirable to provide for an adjustment of the elevator-rollers at least at one end of the elevators, in order to compensate for either shrinkage or stretching of the canvas. I prefer to make this adjustment at the lower rollers. In Figs. 4 and 8 of the drawings I have illustrated the means by which I accomplish this result. The uprights $d'$ of the elevator-frame are preferably metal, and in the lower ends are slots $d^2$, which receive the ends or journals $d^3$ of the rollers. Above the journals and arranged in the slots are half journal-boxes $d^4$, which are movable up and down in the slots and are adjusted by means of set-screws $d^5$, passing through a boss, $d^6$, surrounding the slots. No boxing is necessary below the journals, as the bearing is entirely on the upper side, and obviously the turning of the set-screw will effect the necessary adjustment to keep the elevator canvases taut, as required. I also provide means for stopping the packers when the bundle is completely formed. This is accomplished by the following means: The sprocket-wheel $E^2$, which drives the packer-shaft, is mounted loosely thereon, and is provided with one member of an ordinary toothed clutch upon its outer face. The other member, $e^5$, of the clutch is of usual construction and feathered to the shaft with a spring behind it. A lever, T, is pivoted at one end on a suitable support attached to the elevator-frame, its other end being brought down in front of the flange of the spring-clutch $e^5$. A bent arm or finger, $t$, is fastened to the inner portion of the swinging frame, being extended around back of the latter toward the packer-clutch, and of such length that when the swinging frame comes to rest the end of this finger will be just about in contact with the clutch-lever. The first movement of the swinging frame when started again is a little backward, which turns the finger around still farther, causing it to press against the clutch-lever, and thereby sliding the clutch on the shaft and disengaging it from the sprocket-wheel to stop the packer-shaft.

The operation of most of the mechanisms described above will be understood from the explanations given in connection with the description. I will, however, explain some part of the operation of the machine which has not been fully stated. The trip-arm is fully released, so that the stop-arm for the clutch comes into operation just before the pinion on the end of the jointed shaft reaches the inner end of the rack as it travels backward on the upper side of the latter, so that the swinging frame stops before this pinion leaves the upper side of the rack. In this position the needle-arm is thrown down below the deck and the machine is ready to receive grain for a new bundle. This is delivered from the elevators and packed against the compressor by the action of the packers until finally the tripping mechanism is operated, thereby starting the swinging frame again. From the position in which the devices are left when the frame stops it is evident that the first movement of the latter will be a slight one inward or backward until the pinion has passed to the end of the rack and is moved down half of its vertical motion, or into the position shown in Fig. 4 of the drawings, which, by the way, is the position assumed in the other figures also. This first movement, which is a completion of the backward swing of the frame, unships the clutch on the packer-shaft and stops the motion of the latter. It also brings the pendant against the arm of the lever S', thereby operating the tension device against the cord, and starts the needle-arm on its closing movement, bringing it into about the position shown in Fig. 4 of the drawings. As the pinion comes down on the under side of the rack, the frame begins to swing outward, the needle-arm is closed to place the cord around the bundle, and the tying mechanism is set into motion, as already explained. The tying of the cord is completed and the cord cut just before the outward swing of the frame is completed, when the bundle is discharged, as already explained, and the frame is moved back into the position of rest.

It will be understood, of course, that all the driving devices and all the operating parts are constructed and arranged and timed with reference to each other so as to produce the movements and operations herein described and explained in their proper relative order; but it is not necessary to enter upon a minute description of the details of construction by which this is effected, as they are mere matters of calculation and mechanical arrangement, and it will be understood by those skilled in the art.

I do not wish to be understood as limiting myself in all respects to the particular devices which I have herein shown and described, for there may be many changes and substitutions in many of the parts without changing materially the controlling features of my invention, and such changes are contemplated in the application of my improvements to different machines.

Having thus described my invention, what I claim as new, and desire to secure by Letters Patent, is—

1. The elevators, in combination with the rakes, the sliding board C, the supporting-arm $c$, and the rod $c'$, substantially as and for the purposes set forth.

2. The binder-deck, in combination with the swinging frame, the breast-plate mounted on the upper portion thereof, and the central supporting-arms, $e$, of the packer, extending forward on each side of the breast-plate, substantially as and for the purposes set forth.

3. The swinging frame, in combination with the cam and gear wheel shaft mounted thereon, the cam and gear wheel provided with two sets of gear-sections and cams and loose on its shaft, clutch mechanism constructed and arranged to be operative when the frame swings outward and inoperative on the return movement, and mechanism whereby a half-turn is given to said shaft on the outward swing of the frame and a backward half-turn on the inward swing, substantially as and for the purposes set forth.

4. The swinging frame G, in combination with the depending bracket $g$, provided with a vertical slot, $g^{10}$, the jointed shaft G', the outer section of which passes through said slot, the pinion $g^5$, and the rack G², substantially as and for the purposes set forth.

5. The shaft G', in combination with the loose wheel $g^3$, provided with clutch teeth or wings $h^6$, the pawl H, pivoted to a support, $h$, on the shaft and provided with a circular slot, $h'$, through which the shaft passes, the roller $h^2$ on the pawl, and an actuating-spring, $h^4$, substantially as and for the purposes set forth.

6. The swinging frame G, in combination with the cam and gear wheel shaft J, mounted on the upper part of the frame, the beveled pinion $j$, the rack $j'$, the cam and gear wheel K, mounted loosely on the shaft, and clutch mechanism operative in one direction to connect the wheel to the shaft, substantially as and for the purposes set forth.

7. The cam and gear wheel K, provided with the peripheral cam-rim $k'$, provided with shoulder-stops $k^2$, in combination with an oscillating shaft on which it is loosely mounted, the arm K', fastened to the shaft, and the spring-pawl $k^3$ and arm $k^6$ pivoted to said arm, together with a retracting-spring, substantially as and for the purposes set forth.

8. The oscillating shaft J, in combination with the loose cam and gear wheel K, provided with the stops $k^2$, the spring-pawl $k^3$, the spring-catch K², and the lever $k^6$, substantially as and for the purposes set forth.

9. The oscillating shaft J, in combination with the loose cam and gear wheel K, provided with the bent flange $k'$ and the stops $k^4$, the spring-catch K², and the spring-catch K³, substantially as and for the purposes set forth.

10. The pivoted bracket $m^3$, provided with a friction-roller, $m^5$, in combination with the compressor M, mounted on the bracket, and the track M², provided with the inclined lip $m^6$, substantially as and for the purposes set forth.

11. The swinging frame, in combination with the discharge-arms N, pivoted to a suitable support on the frame, the crank-arm $n'$, and the link-rod $n^2$, connected to the crank at one end and to a stationary part of the machine at the other end, substantially as and for the purposes set forth.

12. The pivoted tension-lever R', in combination with the rod S, spring $s$, crank-lever S', and swinging frame provided with an arm arranged to operate the crank-lever, substantially as and for the purposes set forth.

13. The bracket R, provided with an eye, $r^2$, in combination with the tension-lever R', pivoted thereto, the rod S, springs $s$ and $s'$, crank-lever S', and pendant G³ on the swinging frame, substantially as and for the purposes set forth.

14. The swinging frame provided with a finger, $t$, in combination with the sliding spring-clutch on the packer-shaft, substantially as and for the purposes set forth.

RICHARD EMERSON.

Witnesses:
WALTER H. LOOMIS,
STEPHEN S. ADEE.